United States Patent [19]
Swanson et al.

[11] 3,784,163
[45] Jan. 8, 1974

[54] WHEEL WINCH WITH UNIVERSAL HUB

[75] Inventors: Paul A. Swanson, Excelsior; Robert W. Wiele, Minneapolis, both of Minn.

[73] Assignee: Frank D. Werner, Minneapolis, Minn.

[22] Filed: Aug. 31, 1971

[21] Appl. No.: 176,506

[52] U.S. Cl. .................................. 254/166, 242/95
[51] Int. Cl. ............................................... B66d 3/00
[58] Field of Search ................... 254/166, 135 CE; 242/95; 301/5 B, 11 R, 1 KD, 38

[56] References Cited
UNITED STATES PATENTS

| | | | |
|---|---|---|---|
| 972,821 | 10/1910 | Cline | 301/38 X |
| 1,348,331 | 8/1920 | Stringer | 254/135 CE |
| 1,484,007 | 2/1924 | Bruns | 254/166 |
| 2,662,731 | 12/1953 | Smith | 254/166 |
| 3,099,416 | 7/1963 | Wright | 242/95 |
| 3,292,905 | 12/1966 | McCain | 242/95 X |

*Primary Examiner*—Evon C. Blunk
*Assistant Examiner*—James Wilson Miller
*Attorney*—Ralph L. Dugger et al.

[57] ABSTRACT

A wheel mounted winch for vehicles such as automobiles or four wheel drive vehicles utilizing a hub which permits universal mounting of the unit onto any of the standard wheel bolt patterns. The hub is made so that it may self-center through the use of the proper wheel support bolts. The winch includes a drum that is drivably mounted with respect to the hub, and which can be released from driving engagement for free wheeling to unreel the cable or rope used on the winch.

10 Claims, 6 Drawing Figures

PATENTED JAN 8 1974

INVENTORS
PAUL A. SWANSON
ROBERT W. WIELE
BY
Hugger Peterson Johnson & Westman
ATTORNEYS INVENTORS
PAUL A. SWANSON
ROBERT W. WIELE
BY
Dugger Peterson Johnson & Westman
ATTORNEYS

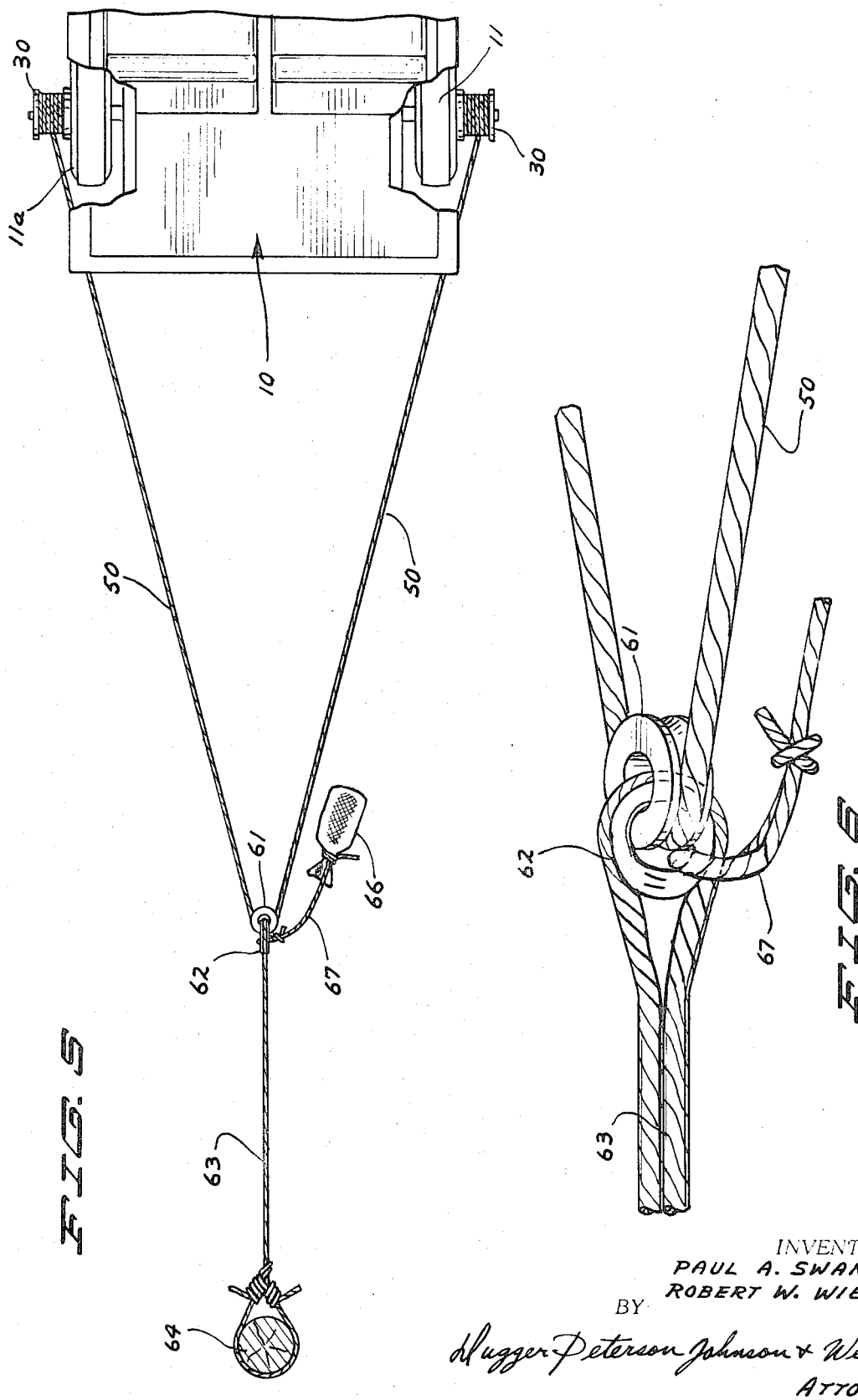

WHEEL WINCH WITH UNIVERSAL HUB

BACKGROUND OF THE INVENTION

1. Field of the Invention

The present invention relates to winches used on automobile wheels and the like, and mounting hubs therefore.

2. Prior Art

The use of winches mounted on vehicle wheels for removing a stuck vehicle is quite well known in the art. Examples of this include U.S. Pat. Nos. 3,392,961 and 3,292,905. Both of these patents show wheel mounted winches.

Patents showing other structures include U.S. Pat. No. 3,160,364 that shows a coupling nut for attaching a wheel hub onto a wheel, and U.S. Pat. No. 3,224,704 which is similar in this feature.

None of these winch patents show a true universal hub, for mounting the winches.

Patents which show a hub that can be mounted on more than one wheel bolt pattern include U.S. Pat. No. 2,590,363. A universal hub with concentric slots is described in U.S. Pat. No. 1,712,322. British Patent No. 859,193 shows a slot configuration for a mounting hub that is more limited in use than the present device.

SUMMARY OF THE INVENTION

The present invention relates to a winch using a universal mounting hub for mounting onto wheel bolts of vehicles. The hubs are made so that they will fit onto any of the generally used wheel bolt circles for a wide range of vehicles including passenger cars, four wheel drive vehicles, and trucks. The winch of the present invention is used in combination with the hub and drives from the hub, which can be left on the wheel itself when the winch drum is removed. The winch includes a mounting spindle that permits releasing the winch drum to permit unwinding the cable or cord as the drum free wheels. The drum can easily be engaged with driving lugs on the hub, tightened into place, and power driven.

The device is made so that it is easily manufactured, gives safe driving without slippage, and has the free wheeling feature, as well as the feature of being universally adaptable to a wide variety of mounting bolt configurations.

It is therefore an object to present a vehicle winch that can be mounted with the universal hub left in place on the wheel. It is further object to use the universally mounting hub that can be self-centering when installed, and which can provide free wheeling.

BRIEF DESCRIPTION OF THE DRAWINGS

FIG. 5 is a schematic representation of a typical set up for operation of the present invention; and FIG. 6 is a detail perspective view of a load equalizer used with the arrangement of FIG. 5.

DESCRIPTION OF THE PREFERRED EMBODIMENT

Figure 1:
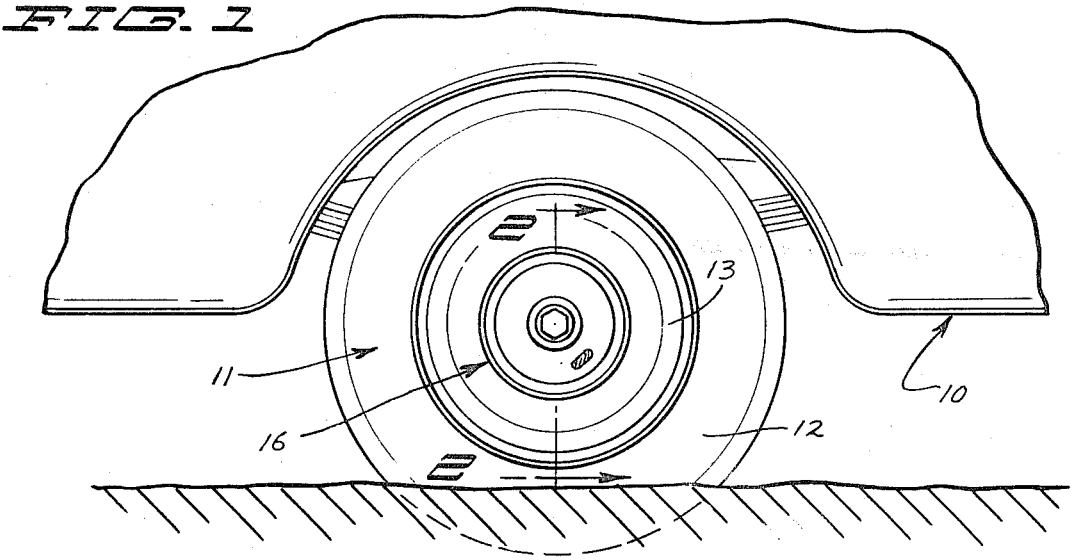
FIG. 1 is a side elevational view of a typical wheel having a winch made according to the present invention and installed thereon.
Figure 2:
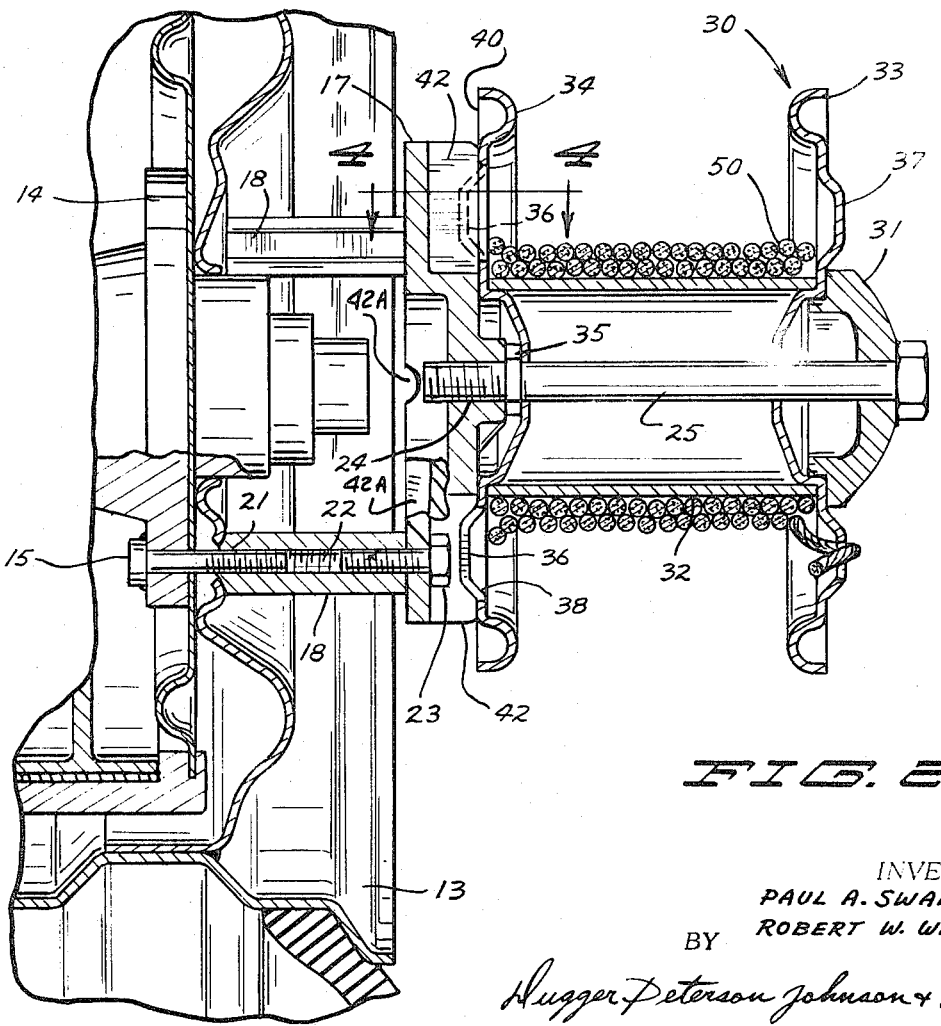
FIG. 2 is a vertical sectional view taken as on line 2—2 of FIG. 1.
Figure 3:
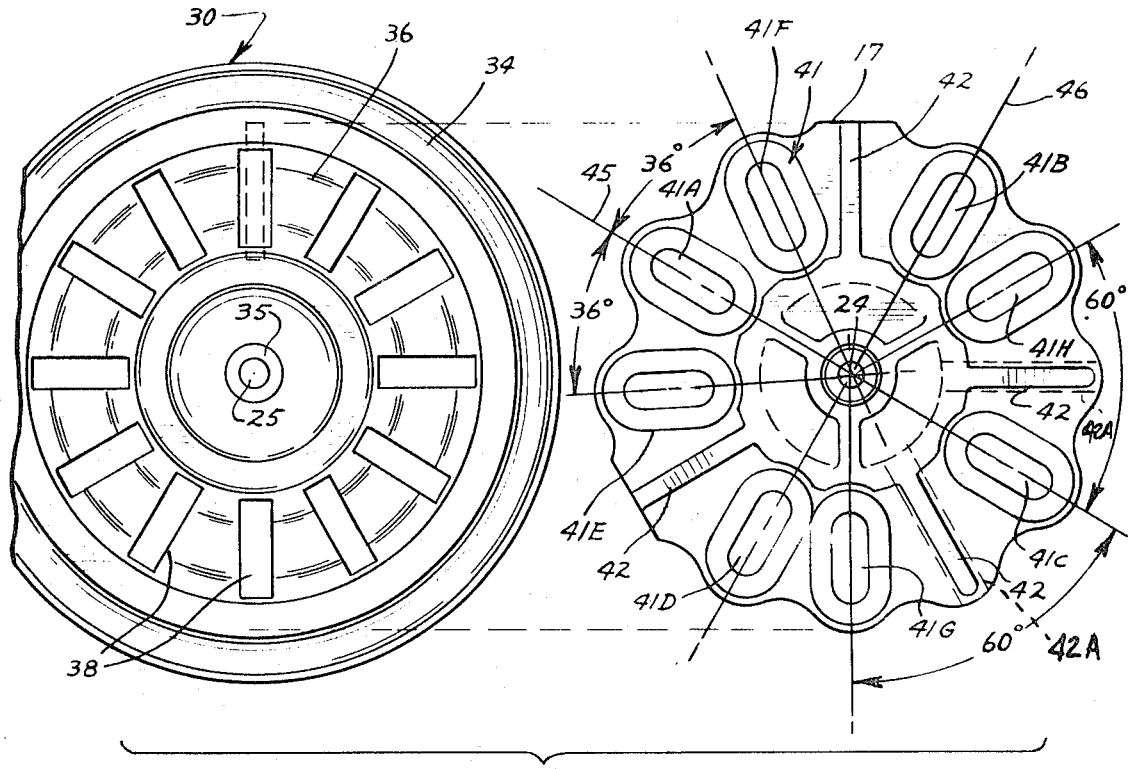
FIG. 3 is a folded open view showing the face of the mounting hub for the present invention and the configuration of the mounting holes therefore as well as the driving lugs, and showing the driving apertures in the winch drum used with the present invention.
Figure 4:
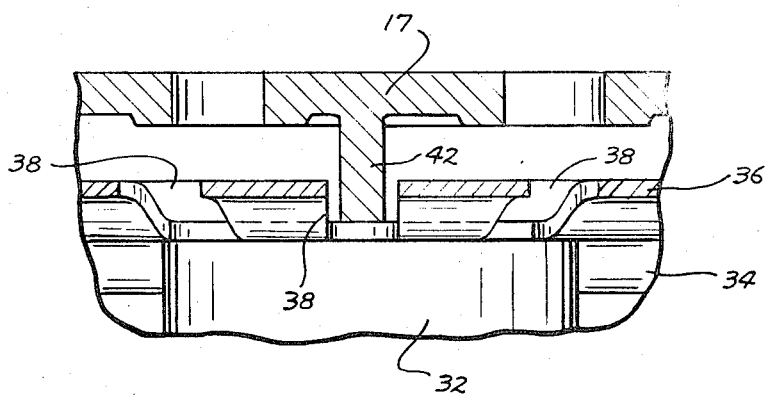
FIG. 4 is a fragmentary sectional view taken as on line 4—4 of FIG. 2.

As shown in FIG. 1, a vehicle 10 comprises a drive wheel 11, which has a tire 12 and a wheel rim 13 mounted onto the drive axle. The axle in the usual manner, has a wheel hub (see FIG. 2) 14, and this wheel hub is used for mounting the vehicle wheel 13.

The hub 14 has wheel bolts 15 mounted thereon and extending outwardly therefrom and which are used for securing the wheel 13 in place. The winches are generally used for removing the vehicle from mud or snow by attaching winches to both power wheels and using an equalizer assembly for the ropes.

When the winch assembly illustrated generally at 16 is to be used, a mounting adapter hub 17 is mounted onto three or four of the wheel bolts 15 (as shown) through the use of elongated coupling nuts 18. As shown, the coupling nuts 18 are tapered at one end 21 so that they will fit into the receptacles in the wheel and hold the wheel 13. The coupling nuts are used instead of the wheel nuts normally used, and have an internal threaded bore 22 which is of sufficient length so that it will receive a cap screw 23 that secures the adapter hub 17 onto the outer ends of the coupling nuts 18 or may have a threaded male end if area 15 has an internally thread bore. As can be seen, the outer ends of the nuts 18 are machined off to have right angle surfaces used for mounting the inner face of the adapter hub 17.

The adapter hub 17 is provided with a center threaded opening 24, which receives a threaded spindle bolt 25 having a hexagon head on the outer end thereof. The spindle bolt 25 in turn rotatably supports a drum assembly illustrated generally at 30. The drum assembly 30 is made so that it can be moved against the outer face of adapter hub 17 by the spindle bolt 25 acting through a drum retainer 31 at the outer end or side of the drum 30.

The drum 30 includes a center tube member 32, an outer end flange member 33, and an inner drive end flange member 34. The end flange members 33 and 34 are fixed to the tube and have center openings that fit closely over the spindle 25. A lock nut 35 is threadably mounted onto the spindle bolt 25 and fits between the end flange member 34 and the mating portions of the adapter hub 17. Thus when the spindle bolt is backed off or moved outwardly from the adapter hub, the lock nut 35 will pull the drum assembly 30 outwardly away from the adapter hub 17. The end flange member 34, as shown, has an annular bead 36 stamped therein, and also the end flange member 33 has the same configuration annular bead 37 stamped therein. The beads protrude toward the outside of the drum assembly. The annular bead 36 of the end flange member 34, has a plurality of straight sided apertures 38 punched therein at evenly spaced intervals. The holes are punched before the bead is formed. Thus the apertures 38 are defined by edges of the opening formed in the portion of the bead 36 that extends perpendicular from the general end plane 40 of the end flange. These form the drive apertures for the drum.

The adapter hub 17 has radially extending drive lugs 42 properly spaced thereon (there are four drive lugs 42). The lugs 42 project outwardly from the outer face of the adapter hub, and these lugs 42 are positioned to mate with the apertures 38 in the bead 36 to form a driving connection between the drum assembly 30 and the adapter hub itself. As shown, there are twelve of the drive slots 38, and the lugs 42 then are positioned so they will engage four of the slots. The hub has a plurality of mounting slots 41 which are positioned in a very precise manner with respect to a reference axis. As shown, the slots are elongated in radial direction, to form radially extending slots. There are eight slots which give a wide variety of positions for mounting the adapter hub onto a number of different bolt circles. Of course the diameter of the bolt circles can vary because of the elongated slots, and this is a first factor necessary for universal mounting. The openings or slots 41 are keyed from a reference axis 45 and an axis 46 at right angles thereto. A slot 41A, centered on axis 45 is used as a key opening for positioning slots 41B, 41C, and 41D. These four slots are positioned 90° from each other and are on the axes 45 and 46 (for four bolt wheels). Slots 41E and 41F are positioned 36° on either side of the key opening 41A, and are used with slot 41C for five bolt wheels. Slots 41G and 41H are positioned 60° on either side of the slot 41C (120° from slot 41A) and are used with slot 41A for six bolt wheels.

Thus there are these elongated slots shown generally at 41 which are irregularly spaced, but in a definite pattern to provide for use with bolt circles having four, five, or six fastening bolts (or multiples thereof), and at different diameter bolt circles.

In addition, adequate driving lug surfaces are provided, and should be noted that the sides of the driving lugs 42 are perpendicular to the inner face of hub 17. The lugs will enter the openings 38 and will drive the drum in a suitable manner.

In use, then, the adapter hub 17 is mounted with suitable coupling nuts 18 to a wheel on which it is to be mounted (two wheels on the opposite sides of the vehicles may be used as shown and explained in relation to FIG. 5) and when the unit is not in use, the spindle bolt 25 can be removed completely as can the drum and the rope indicated at 50. The rope 50 can be fastened to the outer end flange 33 in any suitable manner, such as threading the rope through a pair of openings.

When the unit is mounted, the inner end of the spindle bolt 25 is threaded into the opening 24. The drum is held on the spindle between washer 31 and lock nut 35 so it moves axially with the spindle. The spindle is supported on the adapter hub before the lugs 42 engage apertures 38 so the drum can be rotated freely to permit unwinding rope from the drum. When driving connection is to be made, the spindle is turned in until the lugs enter aligned apertures 38. The spindle is locked tightly by tightening the bolt 25 with a suitable lug wrench to keep the drum in driving engagement and preload it tightly against the adapter hub.

The winch can be used as desired. The adapter hub can be left in place on the wheel when the winch is not in use. The hub has asymmetrical lugs 42 but is balanced by means of cast in weight reduction grooves 42A on the back side of the hub behind the lugs on opposite sides of slot 41C so wheel balance is unaffected. The hub overall profile height when mounted on the wheel is low enough to permit the installation of most hub caps or wheel covers without removal of the adapter hub.

The rib or bead 36 has a center portion and tapered walls extending to the main part of the flange on the winch drum. The slots extend into the tapered portion so the outer faces of lugs 42 seat on the main part of the flange when the winch drum is in driving position. This stabilizes the drum for use.

Referring specifically to FIG. 5, a schematic representation of the use of the winch assemblies of the present invention is shown. In this particular instance, the vehicle 10 is shown being moved in rearward direction, and uses the usual powered components of a automobile or four wheel drive vehicle including a differential and axles, extending out to the rear wheels 11, and 11A (the vehicle may be pulled forward in similar fashion). The wheels 11 and 11A are driven in usual manner. The wheels each have the drums 30 mounted thereon as previously explained, and the rope 50 extends rearwardly from one of the drums and is passed through a load equalizer ring or thimble 61, and then back to the opposite drum 30 on the wheel 11A. The load equalizer thimble 61 is in the form of a round pulley or sheave, and is rotatably mounted over a similar round pulley or sheave 62 that in turn is attached to an anchor rope 63 as shown. The anchor rope 63 is fastened to a fixed object 64 such as a tree, stake, another vehicle, or some other solid object. The anchor line 63 thus provides the reaction against which the vehicle operates when it is being removed from its stuck position.

The thimbles 61 and 62 are special extremely light weight metal thimbles, and are not the heavy block and tackle normally utilized in winch assemblies. The outer surfaces of the thimbles are formed with concave grooves so the ropes or lines fit into the outwardly facing grooves. The inner surfaces of both thimbles nest together and can turn or slide as the ropes or lines move or twist.

Because of the light weight of the rings or thimbles 61 and 62, hazards due to a breaking anchor line 63 are greatly reduced because the weight is greatly reduced. In addition, as a safety feature, a small drag weight 66 (about 10 pounds for example) can be attached with a elastic safety line 67 to the thimble 62. This drag weight 66 can be a 10 pound bag of sand that is resting on the ground, and is attached with an elastic safety line 67 to the thimble 62 so that if the anchor line 63 snaps, the weight 66 will be dragged and absorb any of the energy in the light thimbles 61 and 62 and the lines to prevent injury to spectators or bystanders.

The thimble 61 will rotate on thimble 62, in order to equalize the load on the segments of the line 50 running from the thimble 62 back to the respective winch drum. In like manner, thimble 62 will rotate on thimble 61, in order to equalize the load on the segments of the line 63. The drums 30 of course are initially placed for free wheeling so that the line 50 can be unreeled, and then the slack in the line 50 can be taken up by rotating the drum by hand. The drum mounting bolts are then tightened on each of the winch assemblies being used, namely for wheels 11 and 11A, and the drum bolts can be firmly tightened with a suitable wrench. After the load equalizer has been checked to insure that the thimbles rotate freely on each other, the vehicle 10 can be started and as shown the wheels driven in reverse. Slow buildup of the torque is accomplished until the vehicle begins to move, and as the vehicle pulls free the torque can be reduced. The line 50 is loosened in a suitable manner, and then the load line may be detached. Both the drums 30 are removed, and they can be stored until they are again needed.

The winch can be used to lift or pull cars, boats, trailers, fallen trees or other objects, by raising the wheel or wheels being used for driving the respective drums clear of the ground. If two winches are used as shown in FIG. 5 for lifting an object, both wheels would be lifted clear of the ground and the vehicle solidly blocked to prevent the vehicle from moving, and then the winches would be driven.

If the load is light enough, or if other conditions permit, only one wheel may be lifted off the ground, and one winch used for moving the object.

The winch can be used in many different places. Suitable guides for the rope or cable used may be provided to guide the rope or cable to clear the vehicle body if necessary. Usually, the rope 50 will merely slide against the sides of the tires of the car for guidance.

The mounting spindle bolt includes the nut 35 to positively move the winch drum out of driving engagement with the lugs on the adapter hub so the free wheeling for reeling or unreeling the rope or cable is positive. The lugs 42 and slots 38 will not accidently engage. Of course, the spindle remains supported on the adapter hub during this free wheeling.

In addition, the coupling nuts hold the winch adapter hub spaced from the wheel hub so no large clearance recesses have to be provided in the adapter hub. The coupling nuts provide surfaces on which the winch adapter hub will be positively seated. The surfaces of the coupling nuts lie in a common plane. The adapter hub construction is therefore simplified because the configuration of the wheel and wheel hub does not matter. The winch adapter hub does not rest directly on any portion of the vehicle wheel.

The lock nut 35 is friction locked in place on the spindle threads. A friction locked washer may also be used.

What is claimed is:

1. A winch assembly for mounting on the wheel hub of a powered vehicle comprising a mounting hub, means to attach said mounting hub to said wheel hub, a winch drum having end flanges and a center member joining said flanges, a mounting spindle having a longitudinal axis, said drum being rotatably mounted on said mounting spindle, means fixed in longitudinal axial position on said spindle to retain said drum on said spindle and prevent substantial axial movement of said drum on said spindle, said spindle having an outwardly extending end portion, means on said mounting hub to retain and support said end portion of said spindle while said spindle is moved in longitudinal axial direction with respect to said mounting hub between first and second positions, and cooperating engagable drive means on said mounting hub and said drum, said spindle being movable from said first position wherein the engagable drive means are engaged to said second position wherein said engagable drive means are disengaged, said means to retain said drum on said spindle engaging said drum to mechanically move said drum with said spindle to positively disengage said engagable drive means when said spindle is moved to said second position.

2. The combination as specified in claim 1 wherein said engagable drive means comprises a plurality of lugs extending from the face of said mounting hub, and a plurality of slots in one end flange of said drum adapted to mate with said lugs for driving connection.

3. The combination specified in claim 1 wherein said wheel hub has wheel bolts thereon, and a wheel is mounted to the vehicle with said wheel bolts, and said means to attach said mounting hub comprises internally threaded elongated coupling nuts threadably mounted onto the wheel bolts on the wheel hub on which said winch assembly is mounted, said coupling nuts having threads of sufficient length to tighten said wheel in place on said wheel hub while leaving outwardly extending ends of said coupling nuts with internal threads unoccupied, and cap screw means threaded into said outwardly extending ends of said coupling nuts to hold said mounting hub in place, said elongated coupling nuts having end surfaces lying in a common plane to support said mounting hub.

4. The combination as specified in claim 1 wherein said wheel hub has a plurality of wheel bolts thereon arranged in a bolt circle and wherein said mounting hub comprises a universal hub assembly, and said universal hub assembly includes elongated radially extending mounting bolt slot means positioned in predetermined locations around the periphery thereof, said mounting bolt slot means being of sufficient length to accommodate different bolt circle diameters of different wheel hubs, and said mounting bolt slot means including a sufficient number of mounting bolt slots spaced to provide at least a three bolt mounting on wheel hubs having wheel bolts positioned at one of the spacings comprising substantially 90° to one another, 60° to one another, or 72° to one another.

5. The combination as specified in claim 1 wherein said means to retain said drum on said spindle includes a washer bearing on one flange of said drum, and means mounted on said spindle to force said one flange against said washer.

6. The combination specified in claim 2 wherein the flange of said drum facing said mounting hub has an annular rib formed therein and spaced outwardly from the axis of said drum with center portions of said rib extending toward said mounting hub, and said slot means being formed through the center portions of said rib whereby the surfaces defining said slot means will engage one of said lugs on opposite sides of said lug for rotational driving connection.

7. The combination as specified in claim 1 wherein said means on said mounting hub to retain said spindle comprises a threaded opening, the outwardly extending portion of said spindle being threaded into said opening.

8. The combination as specified in claim 6 wherein said annular rib has tapered portions extending from the center portions of the rib to the main portion of said flange, and wherein slot means extend along the tapered portions of said rib, and the main portion of said flange nests tightly against said mounting hub when the spindle is moved to its first position.

9. The combination as specified in claim 4 wherein said mounting hub has eight slots positioned around the periphery thereof, first and second ones of said slots being centered along a first plane and diametrically opposed, third and fourth ones of said slots being centered on a second plane at right angles to the first plane and diametrically opposed, fifth and sixth ones of said slots being positioned substantially 36° on opposite sides of said first plane and adjacent said first slot, and seventh and eighth of said slots being positioned 60° on either side of said first plane and adjacent said second slot.

10. The combination of claim 9 wherein said mounting hub has an axis of rotation and said cooperating engagable drive means includes a plurality of drive lugs on said mounting hub for driving said winch drum, said lugs being asymmetrically located about the axis of rotation of said mounting hub and positioned between said slots, and weight reduction grooves defined in the side of said mounting hub opposite from said drive lugs and positioned directly opposite from at least one asymmetrical lug to balance said mounting hub about the axis of rotation thereof.

* * * * *